(No Model.)
J. W. & A. W. FRENCH.
NUT LOCK.
No. 522,888. Patented July 10, 1894.
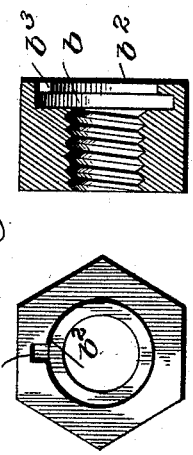
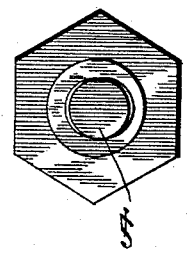
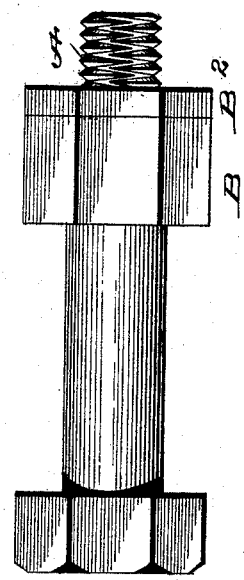
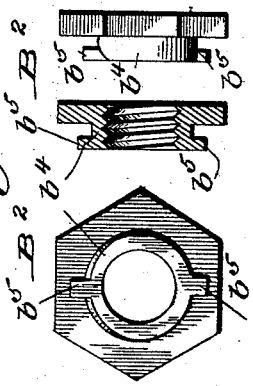
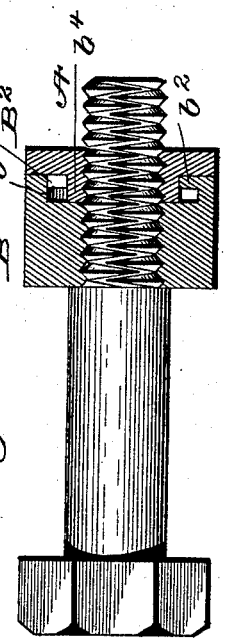
James W. French
Alexander W. French
Inventors
Witnesses

UNITED STATES PATENT OFFICE.

JAMES W. FRENCH AND ALEXANDER W. FRENCH, OF MICHIGAN CITY, INDIANA.

NUT-LOCK.

SPECIFICATION forming part of Letters Patent No. 522,888, dated July 10, 1894.

Application filed April 16, 1894. Serial No. 507,741. (No model.)

*To all whom it may concern:*

Be it known that we, JAMES W. FRENCH and ALEXANDER W. FRENCH, citizens of the United States, residing at Michigan City, in the county of La Porte, State of Indiana, have invented certain new and useful Improvements in Nut-Locks; and we do hereby declare the following to be a full, clear, and exact description of the invention, such as will enable others skilled in the art to which it appertains to make and use the same.

This invention relates to an improvement in screws and nuts, and more particularly to the sub-class known as nut and bolt-locks.

The object of the invention is to furnish a ready and efficient means of securing, in any desired position, nuts to bolts, axles, tie-rods, shaft couplings or collars, and various pieces of machinery, in such a manner that the nuts may not become loosened by jarring or by any turning of the bolts or other parts to which they are attached.

The object, furthermore, is to produce such a lock-nut whereby the loosening of one portion of the lock will cause a corresponding tightening of the other, and whereby neither portion can be moved to any material degree, independent of the other.

With these objects in view, the invention resides essentially in the various arrangement and combination of the parts as hereinafter more fully set forth and claimed.

We have illustrated the invention in the accompanying drawings, in which—

Figure 1 represents a side elevation of a bolt or screw with nuts thereon, the same being in a locked position. Fig. 2 is a side elevation of a bolt or screw, the nuts being shown in section. Fig. 3 represents an elevation and a section of the larger nut. Fig. 4 represents a side, sectional, and end view of the smaller nut; and Fig. 5 is an end view of a bolt, with nuts removed, looking toward the shoulder end thereof.

In the drawings, corresponding letters indicate similar parts in all the figures.

In the drawings, A represents a duplex screw, chased for a portion of its length with two threads, one a right-hand and the other a left-hand thread. This screw is elliptical in cross-section, as is shown in the drawings. The locking-nut is in two parts B and $B^2$, as shown in projection in Fig. 1 of the drawings. These nuts, when in locking position, as shown in Fig. 1, appear as ordinary nuts, one being tapped with a right-hand and the other with a left hand thread. They are however, capable of being connected, and in use, are connected. The means which we employ for this purpose is illustrated in the drawings and is as follows: We provide the larger nut with a circular groove $b$ in the outer face of the nut, the rear face $b^2$ forming a collar, and being provided with an opening $b^3$ for a purpose hereinafter specified.

The nut $B^2$ has formed on its inner face, a flange or collar $b^4$ provided with the lugs or projections $b^5$ $b^5$, one of which lugs is designed to be inserted in the groove $b$ at a point opposite the opening $b^3$ by tilting the nut, when the other lug may be caused to enter the opening; this we accomplish by rounding off a portion of the flange or collar. By providing but one opening in the larger nut, all possibility of the nuts being forced out of contact is overcome.

To lock the nuts, they are secured together as above described and the larger nut is turned to the right until the smaller engages its thread, when it is possible to continue the operation, only by turning one in one direction and the other in a reverse direction at even rates of speed. Should they bind, one nut may be turned sufficient to overcome the binding, when the operation is continued. In order to unlock the nuts the operation is reversed.

We are aware that it is not new to employ a duplex bolt or screw, provided with a right and left hand thread in conjunction with locking nuts with right and left hand threads respectively, but the disadvantages of this construction are obvious, one important disadvantage being, that while the lower nut is prevented from becoming loose, by the impact with the upper, nothing prevents the upper nut from becoming loose, and should it become loosened, its efficiency in securing the lower, is completely overcome; but by the employment of our device as herein outlined, neither nut can move independent of the other.

Having thus fully described our invention, what we claim as new, and desire to secure by Letters Patent, is—

A nut-lock consisting of a double-threaded screw, and two nuts right and left-threaded respectively, one nut being provided with a groove and overhang, an opening in said overhang, and the other being provided with a flange having formed thereon lugs to engage the opening, one end of said flange being rounded off, as and for the purposes set forth and described.

In testimony whereof we affix our signatures in presence of two witnesses.

JAMES W. FRENCH.
ALEXANDER W. FRENCH.

Witnesses:
WILLIAM H. XANDERS,
CHAS. H. RITTER.